April 6, 1948.  L. HORNBOSTEL  2,439,251
BAND GUIDE
Filed March 2, 1946  3 Sheets-Sheet 3
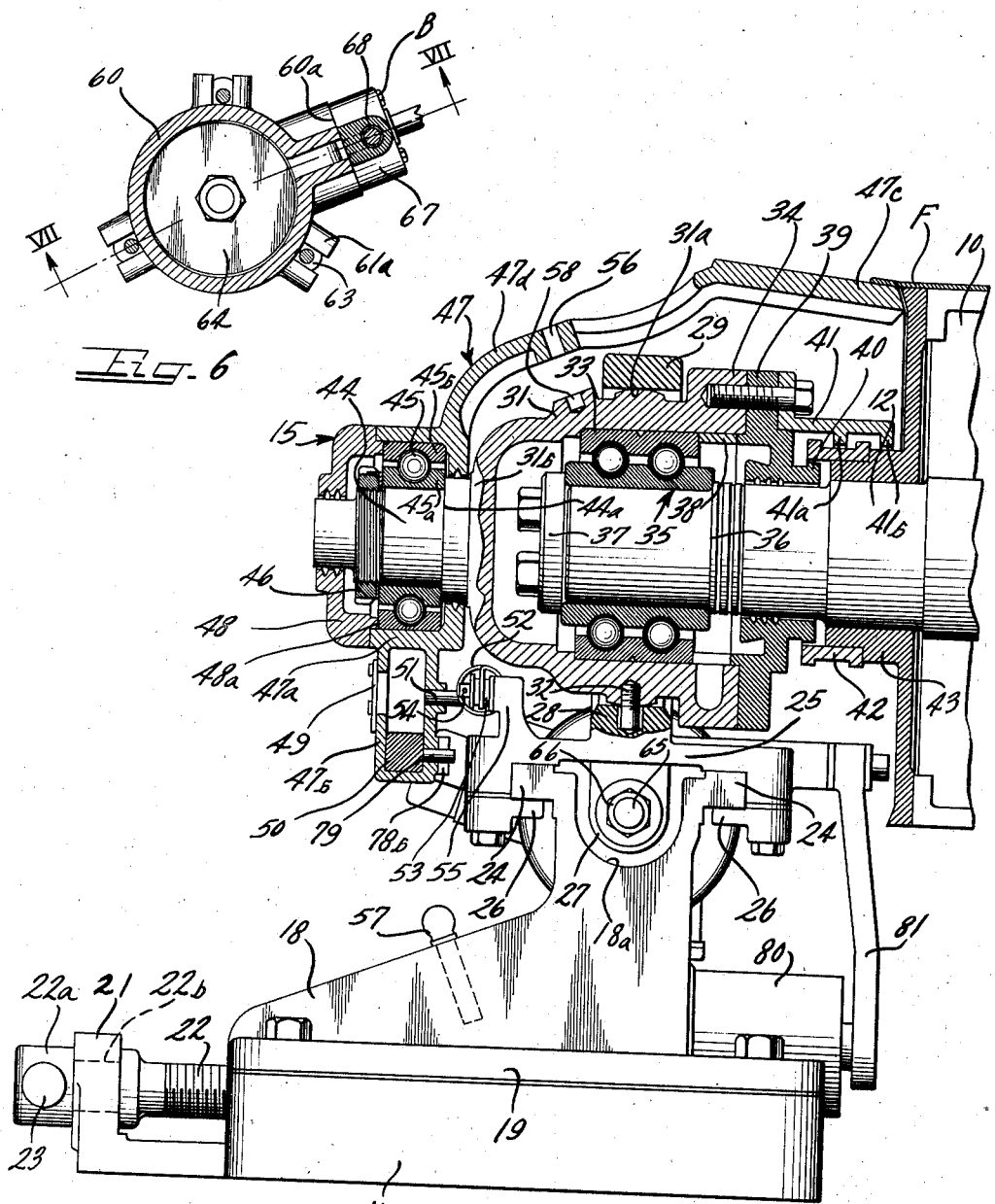
Inventor
LLOYD HORNBOSTEL
By The Firm of Charles W. Hills Attys.

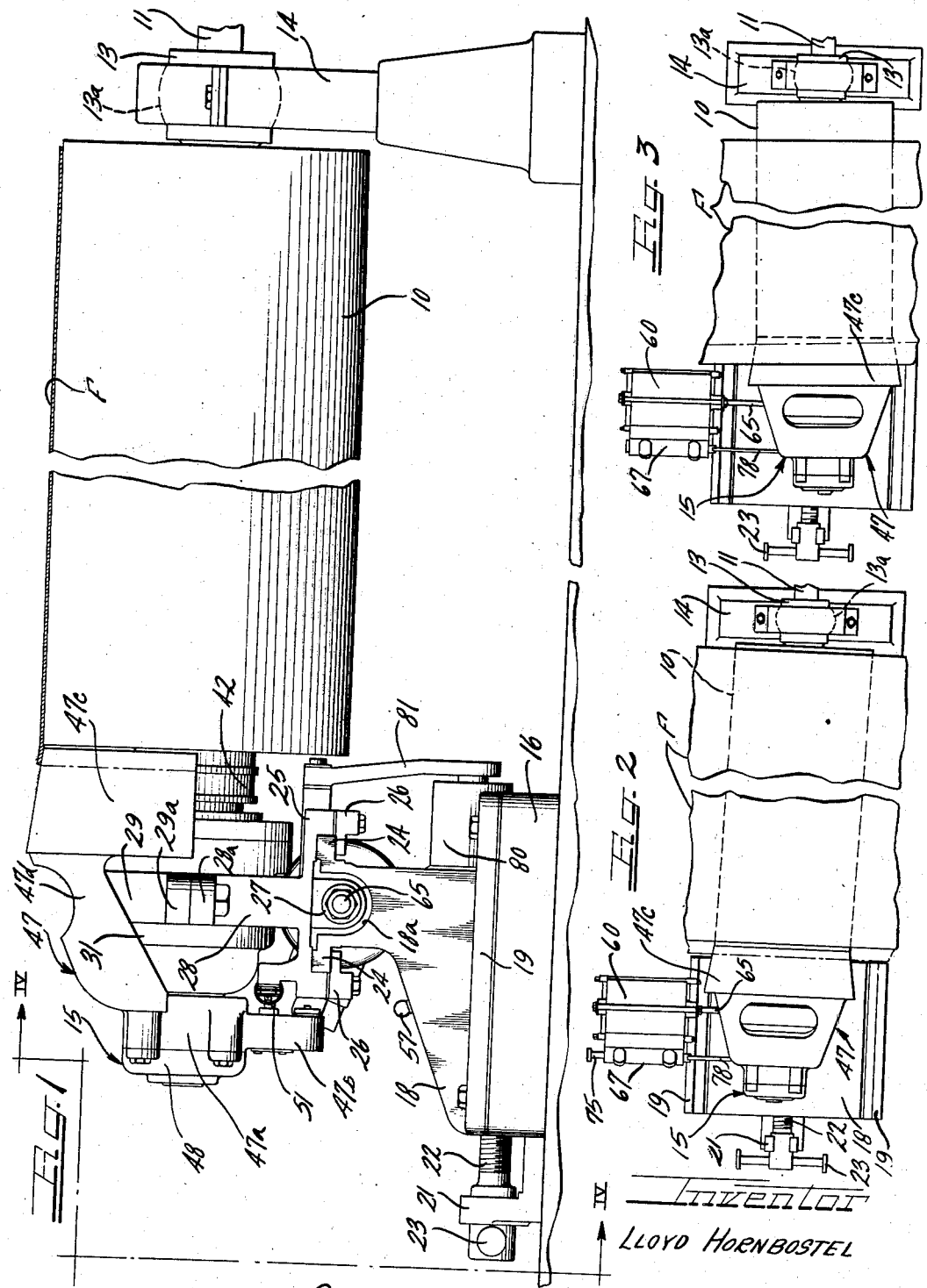

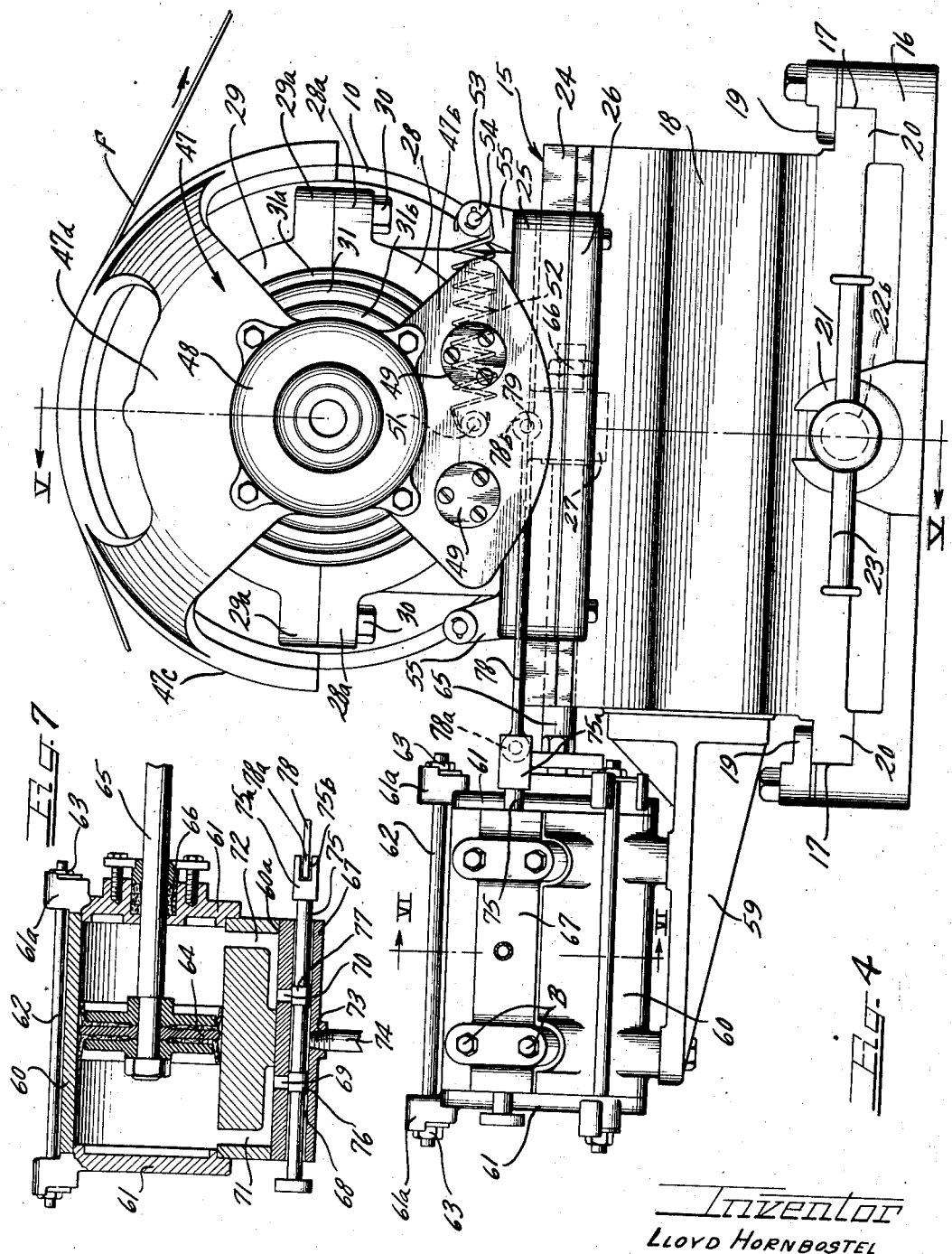

Patented Apr. 6, 1948

2,439,251

UNITED STATES PATENT OFFICE 2,439,251

BAND GUIDE

Lloyd Hornbostel, Beloit, Wis., assignor to Beloit Iron Works, Beloit, Wis., a corporation of Wisconsin Application March 2, 1946, Serial No. 651,578

11 Claims. (Cl. 74—241)

This invention relates to a highly sensitive fluid pressure actuated shifting device for rolls, pulleys, and the like belt or band directing members, that is readily mounted on said members without redesign of the members and is effective to quickly shift the members and then immediately stop at the exact position required for correcting any misalignment of the belts or bands engaged by the members.

Specifically this invention relates to an air operated roll shifting device for centering a band or belt on the roll and including a belt or band engaged control head freely rockable on readily accessible bearings carried by the device outwardly from the roll axles and directly coupled to an air valve to shift the air valve therewith and to stop the shifting movement of the device as soon as misalignment of the belt or band has been corrected.

In my copending application Serial No. 527,784 entitled "Band guide," filed March 23, 1944, now Patent No. 2,431,557, dated Nov. 25, 1947, I have described and claimed an air operated roll shifting device for centering a band on the roll wherein a control head is rockably mounted on bearings interposed between the roll and bearing supports for the roll and wherein the head is indirectly connected to an air valve. This construction of my parent application requires a roll axle of extended length and control head carrying bearings of large diameter to freely embrace the roll axle. The construction also requires the use of intermediate links and pivots for connecting the control head with the air valve.

According to the present invention the necessity for large control head supporting bearings, extended roll axles and intermediate links between the control head and air valve is entirely avoided by rockably mounting the control head on bearings carried by the device in spaced relation from the end of the roll axle and by directly coupling the control head to the air valve. The present construction provides a readily accessible light weight compact control head arrangement which does not in any way interfere with the bearing support for the roll and yet carries the control head immediately adjacent the roll end. The device of this invention is therefore readily mounted on a roll in place of a standard or conventional roll bearing without necessitating any redesign of the roll construction. Since the control head bearings of the device need not surround the roll axle they can be of relatively small diameter to provide a more sensitive and light weight head assembly.

It is then an object of this invention to provide a highly sensitive air operated roll or pulley shifting device for centering a band or belt on the roll or pulley wherein a band or belt engaged control head is rockably carried by the device on readily accessible free acting bearings and is directly coupled to an air valve to simultaneously shift the device and control head whereupon shifting of the control head with the device will move the air valve to its initial position for stopping the shifting movement.

A further object of this invention is to provide a band or belt centering apparatus that is readily attachable to a pulley or roll without redesign of the pulley or roll construction.

A still further object of this invention is to provide a bearing support for a roll which supports a rockably carried band engaged control head on readily accessible bearings that are axially outward of the roll axle.

Another object of this invention is to provide an improved control head arrangement for band guides wherein the head is sensitively balanced and mounted on readily accessible bearings.

A further object of the invention is to provide an air operated roll shifting band guide controlled by a band engaged head overhanging the bearing support for the roll and in turn rockably mounted on bearings carried independently of the roll but in axial alignment with the roll bearings.

Another and a specific object of this invention is to provide a band guide having a control head segment adjacent an end of a roll and mounted on bearings spaced axially outward from the axle of the roll.

Other and further objects of the invention will be apparent to those skilled in the art from the following detailed description of the annexed sheets of drawings which, by way of a preferred example only, illustrate one embodiment of the invention.

On the drawings:

Figure 1 is a longitudinal elevational view, with parts broken away, of a band engaged roll equipped with a band guide shifting device in accordance with this invention.

Figure 2 is a top plan view of the roll assembly shown in Fig. 1 and illustrating the roll in a shifted position to correct for migration of the band too far to the right hand end of the roll.

Figure 3 is a view similar to Fig. 2 but illustrating the roll in a shifted position to correct for migration of the band too far to the left hand end of the roll.

Figure 4 is an end elevational view of the band guide taken along the line IV—IV of Fig. 1.

Figure 5 is a vertical cross sectional view, with parts in longitudinal elevation, taken along the line V—V of Fig. 4.

Figure 6 is a transverse cross sectional view taken along the line VI—VI of Fig. 4.

Figure 7 is a longitudinal cross sectional view taken along the line VII—VII of Fig. 6.

As shown on the drawings:

A roll 10 such as a guide roll for a paper making machine felt F has conventional axles 11 and 12 projecting from opposite ends thereof. The axle 11 is rotatably mounted in a bearing 13 having a fragmental spherical outer wall portion 13a rockably mounted in a support 14 as best shown in Fig. 1. The opposite axle 12 of the roll 10 is rotatably mounted in the roll shifting device 15 of this invention as best shown in Fig. 5. As therein illustrated and as also shown in Fig. 4, the device 15 includes a mounting bed 16 providing longitudinally extending opposed tracks or ways 17, 17 slidably supporting a base frame 18. Strips 19, 19 are bolted on the bed 16 to overlie guides 20, 20 projecting outwardly from the frame 18 for holding the frame against tilting movement relative to the bed. A yoke-like bracket 21 is provided on the outer end face of the bed 16. A bolt 22 is threaded into the bottom of the frame 18 and has a head 22a with a reduced intermediate portion 22b rotatably seated in the yoke bracket 21. The portions of the head 22a on opposite sides of the reduced portion 22b provide shoulders thrusting against the opposite faces of the yoke 21 to retain the bolt against longitudinal movement in the yoke while permitting free rotation of the bolt. A handle 23 is provided through the head 22a to facilitate rotation of the bolt. The rotation of the bolt 22 will effect sliding of the frame 18 on the bed 16 toward and away from the roll 10.

The top of the frame 18 has a longitudinally extending recess 18a therein with gibs or ways 24 on each longitudinal side thereof. A carriage 25 is slidably mounted on the gibs 24 and bridges the recess 18a. The carriage 25 has strips 26 bolted thereon which underlie the gibs to retain the carriage in constant sliding contact with the gibs. Carriage 25 has a cylindrical boss 27 depending into the recess 18a together with a semi-circular yoke or strap portion 28 extending from the top face of the carriage. The strap 28 has outside ears 28a, 28a on its upper ends. A complementary strap portion 29 has outturned ears 29a, 29a overlying the ears 28a, 28a and secured thereto by means of bolts such as 30. The straps 28 and 29 cooperate to define an open ended cylindrical casing or housing receiving a bearing cap or housing 31 therethrough as best shown in Figs. 1 and 5. The housing 31 has a convex band portion 31a therearound rockably seated in the cylindrical casing provided by the straps 28 and 29. A locking pin 32 threaded in the housing 31 projects into a hole in the strap portion 28 to rockably retain the housing 31 in the strap portions 28 and 29.

The housing 31 has a cylindrical bore 33 extending inwardly from a flanged end 34 thereof and receiving the outer race ring of a ball bearing unit 35. This ball bearing unit 35 receives the axle 12 of the roll 10 through the inner race ring thereof and the inner race ring is clamped between a shoulder 36 on the axle 12 and an end cap 37 bolted on the end of the axle. The outer race ring of the bearing 35 is bottomed on a shoulder at the bottom of the bore 33 in the housing 31 and is held thereagainst by means of a spacer sleeve 38 in the open end of the bore 33. The sleeve 38 is bottomed against a cover 39 bolted onto the flanged end 34 of the housing 31 and having a hollow boss portion 40 receiving the axle 12 therethrough. A fragmental cylindrical guard or cap 41 is also bolted on the housing 31 on the outside of the cover 39 and partially embraces a sealing ring 42 carried by a hub portion 43 on the end head of the roll 10 and overlapping a cylindrical portion 40 of the cover 39. As shown, the guard 41 has an inwardly projecting rib 41a extending into the ring 42 and a second inwardly projecting rib 41b extending into close relationship with the hub portion 43.

The roll axle 12 is thereby rotatably supported on an antifriction bearing 35 in a housing 31 carried by the carriage 25 in rockable relation with the carriage. The locking pin 32, however, prevents relative rotation of the bearing housing 31 and the straps 28 and 29 of the carriage 25 while permitting relative swinging of the housing 31 and carriage.

The housing 31 has a solid end wall 31b with an integral outwardly extending axle portion 44 thereon. The axle portion 44 is axially aligned with the axle 12 of the roll 10 and receives a ball bearing unit 45 therearound with the inner race ring 45a thereof bottomed on a shoulder 44a of the axle and held thereon by a nut 46 threaded onto a threaded portion of the axle. The outer race ring 45b of the bearing 45 is surrounded by a hollow hub portion 47a of a control head 47. This hub portion 47a receives a cap 48 thereon with a pilot portion 48a engaging an end face of the outer race ring 45b in the bearing 45. The other end face of this race ring 48a is engaged by a shoulder in the bottom of the hub 47a. The control head 47 is thereby held against endwise movement relative to the axle 44 and is freely rotatable on the axle 44.

A hollow counterweight portion 47b depends from the hollow hub 47a and has removable aperture closing plates 49 giving access to the interior thereof which can be filled with lead or other counterweight material 50. A pin 51 extends from the rear face of the counterweight portion 47b and is engaged by one end of a tension spring 52. The other end of the tension spring is anchored on a roller 53 carried by a pin 54 on an upstanding leg 55 of the carriage 25. The spring 52 pulls the counterweight portion 47b towards the leg 55 thereby rocking the control control head 47 in a counterclockwise direction as viewed from Fig. 4.

The control head 47 includes a fragmental circular tapered collar portion 47c immediately adjacent the end of the roll 10 and adapted to be engaged by the felt F. The collar 47c increases in diameter in proportion to its distance from the roll 10 so as to provide an inclined surface for the felt F. This collar or tapered portion 47c is connected to the hollow hub portion 47a by a web 47d which can be apertured as shown to provide a light weight easily tilted assembly. A hole 56 is provided in the web 47d as shown in Fig. 5 to receive a locking pin 57 stored in the main frame 18 when out of use. A well portion 58 is provided in the bearing housing 31 for receiving the inner end of the locking pin 57 thereby holding the control head 47 against rotation on the axle 44 of the bearing housing 31 when desired. In operation of the unit of course locking pin 57 is removed from the hole 56 and is placed in the hole in the frame 18 as shown in Fig. 5.

As shown in Fig. 4, a leg 55 is provided on each side of the portion 47b of the control head 47 and the spring 52 can be selectively anchored on either one of the legs 55 to urge the control head in the desired direction so that the portion 47c thereof is urged in the opposite direction to the direction of travel of the felt. The device of this invention is therefore readily adapted for use with felts running in either direction on the roll 10.

As also shown in Fig. 4, the main frame 18 has a bracket 59 secured on an end face thereof and extending from this end face to support a cylinder 60. End heads 61 are anchored to the ends of the cylinder 60 by means of rods 62 having end portions extending through lugs 61a on the end heads and receiving nuts 63 in threaded relation thereon acting on the lugs.

As shown in Fig. 7 the casing 60 slidably houses a piston head 64 with a piston rod 65 secured thereon and extending through packing material 66 carried by one of the end heads 61. This piston rod 65 extends directly from the end head 61 of the cylinder 60 through the recess 18a of the frame 18 and into the hollow boss 27 of the carriage 25. Nuts 66 anchor the piston rod to the boss 27.

The cylinder 60 has a built up flat face portion 60a along the length thereof receiving a valve casing 67 thereon. The casing 67 is bolted to the cylinder 60 by means of bolts such as B. The valve casing 67 has a cylindrical passageway 68 extending completely therethrough. Passageway 68 has ports 69 and 70 therein spaced from each other and from the ends of the passageway. The port 69 is connected through a passageway 71 with one end of the interior of the cylinder 60. The port 70 is connected to a passageway 72 with the other end of the interior of the cylinder 60.

An inlet port 73 is provided on the valve casing 67 to receive an air conduit 74. Port 73 is between the ports 69 and 70.

A valve 75 extends through the passageway 68 and has a main body portion of smaller diameter than the passageway so as to provide for flow of fluid through the passageway around the main body of the valve. However, spaced opposed heads 76 and 77 are provided on the body 75 for snug engagement with the wall of the passageway 68. These heads 76 and 77 seal off a space in the passageway between the heads which will prevent leakage from the inlet port 73 out of the ends of the passageway. The valve 75 is adapted to be positioned so that air from the air pipe 74 will be selectively introduced into either end of the cylinder 60 and air in the cylinder opposite the end receiving air from the pipe 74 will be exhausted from the cylinder. In other words when the valve 75 is shifted to the left from the position shown in Fig. 7 so that the head 76 will uncover the port 69, the head 77 will also uncover the port 70 and air from the pipe 74 will flow through the port 69 into one end of the cylinder 60 while air in the other end of the cylinder will flow through the port 70 and out through the right hand end of the passageway 68.

The valve 75 has a clevis end 75a carrying a pin 75b extending through the eye end 78a of a rod 78. The rod 78 has a second eye end 78b receiving a pin 79 projecting from the inner face of the counterweight portion 47b of the control head 47. This pin 79 is positioned immediately below the pin 51 receiving the spring 52.

Whenever the control head 47 is rotated on its bearing 45 to shift the rod 78 for moving the valve 75 to a port uncovering position air is immediately admitted to the cylinder 60 from the air pipe 74 for shifting the piston head 64 in the cylinder and thereby moving the piston rod 65 to slide the carriage 25 on its frame 18. Since the carriage 25 carries the bearing housing 31, movement of the carriage of course moves the roll 10 to swing or cock it relative to its normal position. At the same time, however, the movement of the carriage 25 also moves the control head 47 in the same direction and this movement of the control head will move the link rod 78 for again shifting the valve 75 back to its initial position. Therefore the control head is tilted to initiate shifting of the carriage and the shifting of the carriage brings about movement of the control head which stops the shifting of the carriage. No over correction or hunting movement results.

A shock absorber or oil operated dampener 80 is mounted on the frame 18 and has a swinging shock absorbing arm 81 pivotally connected to the carriage 25 for dampening out jerky or jumpy movements of the carriage by the fast acting piston 64.

As illustrated in Figs. 1 and 5, the portion 47c of the control head 47 normally receives a marginal portion of the felt F thereon. About one inch of the edge of the felt rides on the collar 47c. This riding of the felt on the collar portion 47c imparts a pull on the collar which is sufficient to offset the opposite pull imparted by the spring 52. The spring 52 can be quite light and sensitive.

As shown in Fig. 2 whenever the felt F migrates too far to the right so that it will not impart sufficient drag on the control head portion 47c to hold the head against movement by the spring, the spring will rock the head in a counterclockwise direction thereby pulling the valve 75 to open the port 70 to the air in line 74 and to open the port 69 to exhaust. Air will then enter the end of the cylinder 60 adjacent the frame 18 for forcing the piston toward the other end of the cylinder thereby pulling the rod 65 and moving the carriage 25 toward the cylinder. This will immediately shift the roll to the position shown in Fig. 2 whereupon the felt will again be directed toward the head portion 47c and will ride up on the head portion a sufficient distance to rotate the head against the spring pressure thereby shifting the roll back to its original position.

As shown in Fig. 3 when the felt migrates too far to the left and climbs the control head portion 47c, it will pull the control head in a clockwise direction thereby shifting the valve 75 to open the port 69 to the air line 74 and to open the port 70 to exhaust. Air will thereupon enter the end of the cylinder 60 remote from the frame 18 to force the piston head 64 toward the frame thereby shifting the piston rod 65 and moving the carriage 25 to swing the roll 10 as shown in Fig. 3. The felt will thereupon be directed toward the left hand end of the roll, the drag of the felt on the head portion 47c will be diminished and the roll will be shifted back to its normal position.

In the operation of the device of this invention the migrating felt shifts the control head which shifting immediately effects swinging of the felt guide roll the exact amount necessary to correct for the migration of the felt. The device operates by moving up to the desired correcting position and then automatically stopping. When the condition of the felt has been corrected the device will automatically shift back to its original position. No over correction or hunting is encountered. The control head is sensitively balanced on readily accessible bearings and is actuated by light pull or drag of the felt or other belt or band which is centered by the device.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A centering device for bands and the like comprising a roll having axles projecting from the ends thereof, a rockably mounted bearing rotatably supporting one axle, a bearing housing receiving the other axle therein, bearings in said housing rotatably mounting said other axle, a convex band area around said housing, a strap embracing said band area in rockable bearing engagement therewith, a slidable carriage carrying said strap, said bearing housing having an axle portion projecting therefrom in axial alignment with the roll axle, a control head having a hub freely rockable on said bearing housing axle and having a tapered collar segment overlying said bearing housing and roll axle adjacent the end of the roll, said control head having a counterweight portion depending from said hub thereof, a tensioned spring connecting the counterweight portion with said carriage to rock the collar segment of the control head in a direction opposite to the direction of rotation of the roll, a fluid pressure cylinder fixedly mounted adjacent said carriage, a piston in said cylinder, a piston rod affixed to said piston and extending from said cylinder to said carriage, means fixedly connecting the piston rod and carriage, a slide valve controlling flow of fluid into opposite ends of said cylinder for simultaneously introducing fluid under pressure into one end of the cylinder while exhausting fluid from the other end of the cylinder, and means directly connecting said slide valve with the counterweight portion of said control head whereby rocking of the control head will shift the valve to actuate the piston for shifting the carriage to carry the bearing housing for tilting the roll.

2. A centering device for bands and the like comprising a roll adapted to receive a band thereon, said roll having axles projecting from the ends thereof, a rockable bearing rotatably carrying one of said axles, a second rockable bearing rotatably carrying the other of said axles, a carriage supporting said second bearing, said second bearing having an outwardly projecting axle, a control head freely rockable on said outwardly projecting axle, said control head having a tapered segment overlying the second bearing and adjacent axle and extending alongside of said roll for receiving a portion of the band on the roll, fluid pressure means for shifting said carriage to tilt the roll, a valve connected to said control head regulating said fluid pressure means, and a light spring on said carriage urging said control head in a direction opposite to the direction of rotation of said roll.

3. A band guide comprising a slidable carriage, fluid pressure actuated means arranged for sliding said carriage, a bearing housing tiltably mounted on said carriage, a band receiving roll rotatably supported by said bearing housing, a control head having a segmental tapered portion adjacent an end of said roll for receiving a portion of a band on the roll and having a hub portion remote from said roll rockably mounted on the bearing housing, a counterweight depending from the hub portion of the control head, a spring connecting said counterweight and carriage for urging the tapered portion of the control head in a direction opposite to the direction of rotation of the roll, and a valve connected to said counterweight portion of the control head for controlling said fluid pressure means whereby rocking of the control head by the band on the roll will shift the valve to cause the fluid pressure means to shift the carriage and bearing housing thereby tilting the roll for correcting migration of the band on the roll.

4. A band guide comprising a bed, a frame slidable on said bed, adjusting means for sliding the frame on the bed, said frame having gibs on the top thereof, a carriage slidable on said gibs, a bearing housing tiltably mounted on said carriage, said bearing housing having a laterally projecting axle portion, a roll having an axle projecting into said bearing housing, antifriction bearing elements in said housing rotatably supporting said roll axle, a control head having a tapered head segment adjacent said roll, a web portion overlying the bearing housing, a hub portion surrounding the axle of the bearing housing, and a counterweight portion depending from said hub portion, an antifriction bearing on the axle of said bearing housing rotatably supporting the hub of the control head, said control head being freely rockable on said bearing housing, a fluid pressure cylinder mounted on said frame in spaced relation from said carriage, a piston slidable in said cylinder, a piston rod secured on said piston extending from said cylinder and connected to said carriage, a control valve for simultaneously and selectively introducing and exhausting fluid under pressure from opposite ends of the cylinder to shift the piston in the cylinder, and a link directly connecting said control head with said valve whereby a band on said roll engages the tapered portion of said control head to impart a drag thereon for rocking the control head to a predetermined position and whereby migration of said band onto and off of said tapered portion will shift the control head from said predetermined position to actuate the valve for shifting the carriage and thereby tilting the roll to correct for the migration of the band on the roll.

5. A band guide comprising a bearing housing rotatably supporting one end of a band guide roll, a carriage tiltably carrying said bearing housing, said bearing housing having an axially extending axle portion, a control head freely rockable on said axle portion of the bearing housing and having a portion overlying the bearing housing and means positioned adjacent an end of said roll to receive a portion of the band on the roll, a fluid pressure actuated motor directly connected to said carriage for shifting the carriage to tilt the roll, and a valve for said motor directly connected to said control head.

6. A band guide comprising a tiltably mounted roll, a carriage for one of the tiltable mountings of said roll, a pneumatic motor for shifting said carriage, a control head rockably mounted on the carriage carried bearing and overlying the bearing to extend adjacent an end of the roll, a valve for said motor adapted to shift the motor for driving the carriage in opposite directions, and a link directly connecting said valve with said control head whereby rocking of the control head on said bearing by said belt will shift the valve to drive the motor for shifting the carriage to tilt the roll and correct for migration of the band on the roll.

7. A band guide comprising a bed, a frame slidable on said bed, adjusting means for regulating the frame relative to said bed, a carriage slidable on said frame, a shock absorber mounted on said frame having an operating arm connected to said carriage, an air motor mounted on said frame having a piston rod connected to said carriage, said carriage having an annular strap portion, a bearing housing tiltably mounted in said strap portion of the carriage and having an axle portion extending therefrom, a band receiving roll having an axle rotatably mounted in said bearing housing, a control head freely rockable on the axle of the bearing housing having a tapered segment overlying the roll axle and positioned adjacent the end of the roll to receive a portion of the band on the roll, and a valve operating said motor connected directly to said control head whereby rocking of said control head by said band will shift the valve to operate the motor for sliding the carriage to tilt the roll and whereby shifting of the carriage will automatically move the valve back to its initial position for stopping the shifting movement.

8. A band guide comprising means receiving a band thereon, a bearing rotatably supporting said means, a carriage slidably supporting said bearing, a control head rockable freely on said bearing and having a band receiving face at an end of said means, a fluid pressure actuated carriage shifting device fixedly mounted adjacent said carriage, a slide valve controlling said device and a single link directly connecting said head and valve whereby rocking of the head by said band will shift the valve to actuate the shifting device for sliding the carriage to tilt the means and whereby sliding of the carriage moves the valve back to its initial position to stop the shifting device.

9. In a band centering device, a roll, a control head at one end of the roll adapted to be engaged by a band on the roll, a shiftably mounted roll bearing for said end of the roll, a housing for said roll bearing, and an axle projecting from the end of the housing remote from the roll and supporting the control head for rocking movement relative to the housing.

10. A band guide for a roll having a band looped thereon which comprises a shiftable bearing housing carrying one end of said roll, an air motor adjacent said bearing housing for shifting said bearing housing toward and away from the motor, a valve on said motor for controlling said motor, a rockable control head mounted on said bearing housing at the end of said roll and arranged to receive thereon a marginal portion of the band, and means directly connecting said control head and valve to shift the valve for actuating the motor to shift the bearing housing and thereby tilt the roll whenever the band permits or causes rocking of the control head.

11. A centering device which comprises a roll receiving a band thereon, a shiftable support for one end of the roll, an air motor having a drive connected to said support for moving the support to tilt said roll and thereby shift the band thereon, a tapered segment rockably mounted at the end of the roll on said support to receive a marginal portion of the band thereon, means biasing the segment in a direction opposite to the direction of movement of the band, and a control valve on said motor directly connected to said segment whereby rocking movement of the segment will shift the valve to actuate the air motor.

LLOYD HORNBOSTEL.

REFERENCES CITED

The following references are of record in the file of this patent:

UNITED STATES PATENTS

| Number | Name | Date |
| --- | --- | --- |
| 2,008,318 | Ziegler | July 16, 1935 |
| 2,199,893 | Norton et al. | May 7, 1940 |
| 2,291,830 | Obenshain | Aug. 4, 1942 |